Feb. 26, 1963  W. SHOCKLEY ETAL  3,079,484
THERMOSTAT
Filed Jan. 8, 1960

WILLIAM SHOCKLEY
ADOLF GOETZBERGER
*INVENTORS*

BY
*Flehr and Swain*
ATTORNEYS

United States Patent Office 3,079,484
Patented Feb. 26, 1963

3,079,484
THERMOSTAT
William Shockley, Los Altos, and Adolf Goetzberger, Palo Alto, Calif., assignors, by mesne assignments, to William Shockley, Los Altos, Calif.
Filed Jan. 8, 1960, Ser. No. 1,257
5 Claims. (Cl. 219—20)

This invention relates generally to a semiconductive thermostat and more particularly to a temperature control system employing semiconductive thermostats.

The characteristics of many semiconductive devices, for example, avalanche diodes and transistors, are temperature sensitive. In many applications it is necessary to stabilize the temperature of the devices to maintain constant characteristics. The devices are, for example, placed in an oven to maintain their temperature constant. It can be appreciated that this will substantially increase the cost. Furthermore, the size of the assembly is increased.

It is a general object of the present invention to provide an improved semiconductive thermostat.

It is another object of the present invention to provide a temperature regulating system in which a semiconductive thermostat device supplies heat to maintain constant temperature.

It is a further object of the present invention to provide a four layer semiconductive thermostat.

It is a further object of the present invention to provide a temperature control system which is relatively inexpensive and small in size.

In accordance with the invention, the foregoing objects and others are accomplished by employing a temperature sensitive semiconductive device to either control directly the current to a heating element, or to act both as the thermostatic element and the heating element.

The foregoing and other objects of the invention will become more clearly apparent from the following description taken in conjunction with the accompanying drawing.

Referring to the drawing.

Figure 1:
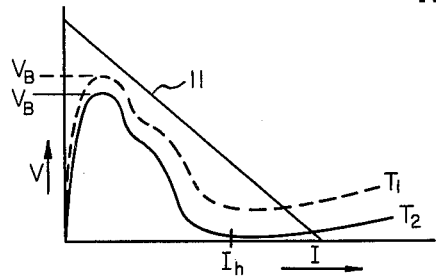
FIGURE 1 shows the voltage current characteristics for a semiconductive thermostat in accordance with the present invention.

The semiconductive thermostat employed by the present invention has characteristics of the type shown in FIGURE 1. It is seen that the device has two stable states: a high impedance, low current state; and a low impedance, high current state. The device is switched from the high impedance state to the low impedance state by application of voltage of predetermined amplitude, $V_B$. Once the device has been switched, it will remain in the low impedance state as long as the current flowing through the device exceeds some value known as the holding current, $I_h$. When the holding current drops below this minimum value, the device will switch back to its high impedance state.

Semiconductive devices having four contiguous layers of opposite conductivity type forming three junctions have characteristics of the type shown in FIGURE 1. The characteristics of the device may be controlled by controlling the layer thickness and impurity concentration. Devices of the foregoing character constructed with silicon will have characteristics which are dependent upon temperatures as indicated by the curves $T_1$ and $T_2$. In general, the alphas of the base layers of the structure increase with increasing temperature and this causes a decrease in the holding current $I_h$. The four layer diode whose characteristics are shown in FIGURE 1 has base layer alphas whose sum is less than one at the temperature $T_1$, but whose sum is greater than one at higher temperatures.

It is seen from FIGURE 1 that for the two different temperatures the voltage across the four layer diode in the holding condition is quite different. In one case, where the sum of the two alphas is greater than one, the voltage is very small. However, for the lower temperature $T_1$, where the sum of the two alphas is less than one, it is necessary for avalanche multiplication to occur or else space charge narrowing of one of the base layers to occur to such a degree that the multiplication factor times the sum of the two alphas is equal to one to achieve the holding condition. If the base layers are made relatively thick and heavily doped, then it will be necessary to have substantial avalanche multiplication to achieve the holding condition. Since avalanche multiplication decreases very rapidly with decreasing voltage, for voltages which are less than one-half breakdown voltage $V_B$, it is evident that a very abrupt change of holding voltage will occur over a relatively narrow temperature range.

Figure 3:
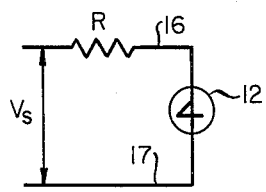
FIGURE 3 shows a circuit diagram of the temperature control system of FIGURE 2.

The way in which the feature can be utilized to produce a simple temperature regulating element is illustrated by the load line 11 in FIGURE 1. The voltage supply $V_s$ and the series resistance R (FIGURE 3) give a load line 11. It is seen that the load line will cause different powers to be dissipated in the device at the temperatures $T_1$ and $T_2$. A greater amount of power will be dissipated in the device under the condition $T_1$ since the voltage drop across the device will be substantially greater.

Figure 2:
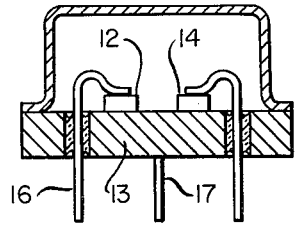
FIGURE 2 shows a capsule including a semiconductive device and a semiconductive thermostat disposed on a heat sink.

Preferably, the device is attached to a heat sink which is to be maintained at constant temperature. Referring to FIGURE 2, the thermostat is intimately connected with a heat sink 13 whereby the heat generated in the device will be absorbed by the sink. The temperature of the device will adjust itself so that the heat loss due to temperature rise will just equal the power input corresponding to the power level between the temperatures $T_1$ and $T_2$.

Referring again to FIGURE 2, a semiconductive device 14, for example, an avalanche diode, which is to have its temperature regulated, is encapsulated along with the thermostat and mounted on the heat sink 13. Voltage $V_s$ is applied between the lines 16 and 17 through a series limiting resistor R. This will cause the four layer diode to assume a temperature in the desired range between the temperatures $T_1$ and $T_2$, as previously described.

It is evident that the devices 12 and 14 and the heat sink 13 may be thermally insulated so that relatively small amounts of power are required.

Figure 4:
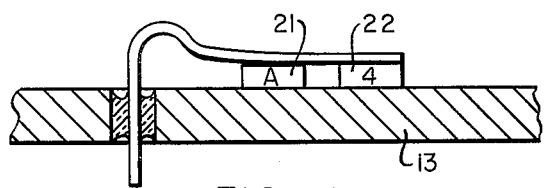
FIGURE 4 shows another embodiment of the invention.

The thermostat described may also be employed to control the power to a heating element, for example, an avalanche diode. Referring to FIGURE 4, an avalanche device 21 and a thermostat device 22 are connected in parallel. These elements are both mounted on the heat sink 13.

Figure 5:
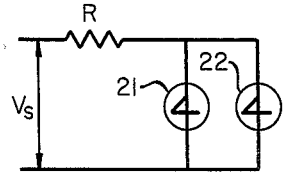
FIGURE 5 is a schematic circuit diagram of the system shown in FIGURE 4.

Referring to FIGURE 5, a schematic diagram is shown.

A voltage supply $V_s$ is supplied through the series resistor R to bring the avalanche diode 21 into its limiting condition. The temperature coefficient of the avalanche diode is selected to be small compared to the temperature coefficient of the switching voltage of the four layer diode. As the temperature rises, the switching voltage $V_B$, FIGURE 1, of the thermostat device decreases. At a certain temperature the two voltages will become equal and the thermostat device will be turned on. The current which was being furnished through the series limiting resistor is diverted from the avalanche diode 21 through the thermostat.

Figure 6:
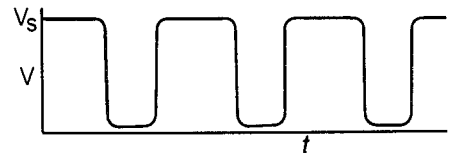
FIGURE 6 shows a suitable voltage for application to the temperature control system of FIGURES 4 and 5.

Intermittently, the external voltage is reduced to such a value that the four layer diode will not remain in its "on" condition. For example, the voltage may be of the type shown in FIGURE 6 varying between the voltage limit $V_s$ and zero. When the voltage is reduced, the thermostatic device will be turned off. When the voltage rises to $V_s$, the device 22 will either remain off or turn on depending upon its temperature, that is, whether its breakdown voltage is less than the regulating voltage or greater than the regulating voltage. Thus, the device serves to either divert current or not depending upon its temperature. It is evident that a very sensitive temperature control system is provided.

Figure 7:
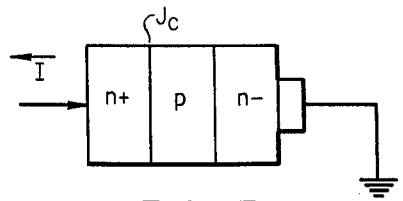
FIGURES 7, 8 and 9 show other semiconductive thermostats.

Although a temperature sensitive four layer silicon device has been described, other semiconductive devices having characteristics of the type shown in FIGURE 1 may be employed as a thermostat. Referring, for example, to FIGURE 7, there is illustrated another thermally sensitive switching device which may be used for thermostat purposes. The device comprises a three layer structure in which one of the layers is very weakly doped. At a certain temperature this layer will become substantially intrinsic. Under these conditions, electrons entering the layer and moving from left to right in the figure will produce an electric field which results in a flow of holes back toward the collector junction $J_c$. Thus, the N-layer will act in effect as a hook collector. See Patent 2,623,105 which describes an N-P-N-I structure in which the intrinsic region, I, acts as a hook collector. It is evident that the effective hook collector multiplication of the N-layer is highly temperature sensitive and thus the device of FIGURE 7 will shift to a low holding voltage and holding current at a certain temperature and may be used in the same manner as the four layer diodes discussed above.

Figure 8:
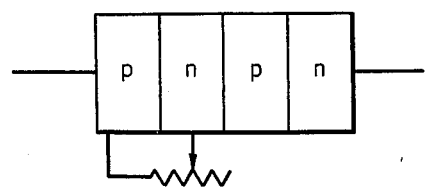

FIGURE 8 illustrates a structure in which the temperature of the switching action may be externally controlled. As shown, an extra terminal is brought out from one of the base layers, N-type in this instance, and connected to an external resistance. If this resistance is small, it reduces the effective alpha value for the N-P-N transistor structure. A higher temperature will be required to bring the sum of the two alphas to unity when a low setting is set on the variable resistor than when a high setting is set.

Figure 9:
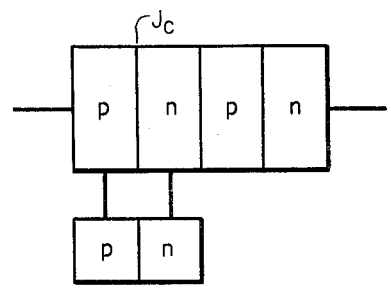

It is also possible to produce thermostatic devices in which the current falls to a small value as the temperature is raised rather than those in which the voltage falls to a small value at high temperature. FIGURE 9 illustrates such a structure. In this case, one of the emitter junctions, $J_c$, is shunted by a P-N junction. If this P-N junction has a higher temperature coefficient of conductance than the P-N junction within the device, then as the temperature rises, it will tend to reduce the alpha of the four layer structure; thus, the structure will be unable to maintain itself in a closed condition. For example, the four layer structure may be made of germanium and the external diode of silicon which has a higher temperature coefficient of conductance. In general, the temperature coefficient of conductance of a P-N junction increases with an increase in the energy gap. Thus, a four layer diode might be made of silicon and the two layer diode of any of the materials having energy gaps larger than silicon.

We claim:

1. A temperature control system comprising a semiconductive thermostat device including four contiguous layers of opposite conductivity type forming three junctions, the center layers of the device forming base layers, a series resistance, and a voltage source serving to apply a voltage to said series combination, said resistance and device characteristics being such that the sum of the alphas for the base layers is greater than one for a first temperature and the sum of the alphas is less than one at some other temperature but that the sum of the alphas times a multiplication factor is greater than one at said other temperature.

2. A temperature control system comprising a semiconductive thermostat, said thermostat being a switching device of the type having two states of operation: a high impedance low current state and a low impedance high current state, said device adapted to switch from the high impedance state to the low impedance state at a predeterminde voltage, said predetermined voltage decreasing with increasing temperature, a heating element connected in shunt with said thermostat, a limiting resistor and a voltage source connected in series with the shunt combination, the voltage of said source being selected at the switching voltage of the thermostat for a predetermined temperature and being of the type which is periodically lowered to reduce current through the thermostat below the holding value whereby when the temperature of the switching device reaches a predetermined temperature it will direct current away from the heating element.

3. A thermostat comprising a semiconductive switching device having four contiguous layers of semiconductive material of opposite conductivity type forming three rectifying junctions, said switching device having two stable states of operation: a high impedance low current state and a low impedance high current state, said layers being so selected that the device is switched from one stable state to the other responsive to changes in temperature, and a variable resistance connected in shunt with one of said junctions to thereby control the temperature at which the device switches from one stable state to the other.

4. A thermostat comprising a semiconductive switching device having four contiguous layers of semiconductive material of opposite conductivity type forming three rectifying junctions, said switching device having two stable states of operation: a high impedance low current state and a low impedance high current state, said layers being so selected that the device is switched from one stable state to the other responsive to changes in temperature, and a two layer semiconductor device comprising first and second layers of opposite conductivity type forming a rectifying junction placed in shunt with at least one of the outer junctions of the four layer device.

5. A thermostat comprising a semiconductive switching device having at least three contiguous layers of semiconductive material forming two junctions, and being of the type having two states of operation: a high impedance low current state and a low impedance high current state, said layers being so selected that the device is switched from one state to the other responsive to changes in temperature, one of the outer layers having an impurity concentration substantially less than the other outer layer.

References Cited in the file of this patent

UNITED STATES PATENTS

| | | |
|---|---|---|
| 2,505,633 | Whaley | Apr. 25, 1950 |
| 2,846,592 | Rutz | Aug. 5, 1958 |
| 2,889,499 | Rutz | June 2, 1959 |
| 2,944,165 | Stoetzer | July 5, 1960 |
| 2,947,844 | Howling | Aug. 2, 1960 |
| 3,001,077 | Van Overbeek et al. | Sept. 19, 1961 |

OTHER REFERENCES

Sutcliffe: Electronics, volume 31, No. 8, March 28, 1958, pp. 81, 82, 84.

Horne et al.: Review of Scientific Instruments; volume 30, No. 12, December 1959, pp. 1132–1134.